United States Patent
Dai et al.

(10) Patent No.: US 8,743,881 B2
(45) Date of Patent: Jun. 3, 2014

(54) LINK DATA TRANSMISSION METHOD, NODE AND SYSTEM

(71) Applicant: Alibaba Group Holding Limited, George Town, KY (US)

(72) Inventors: Neng Dai, Hangzhou (CN); Zhen Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 13/740,750

(22) Filed: Jan. 14, 2013

(65) Prior Publication Data

US 2013/0128775 A1 May 23, 2013

Related U.S. Application Data

(63) Continuation of application No. 12/592,342, filed on Nov. 23, 2009, now Pat. No. 8,379,645.

(30) Foreign Application Priority Data

Nov. 28, 2008 (CN) .......................... 2008 1 0180167

(51) Int. Cl.
*H04L 12/54* (2013.01)
(52) U.S. Cl.
USPC ............ 370/392; 370/400; 709/220; 709/238
(58) Field of Classification Search
None
See application file for complete search history.

(56) References Cited

U.S. PATENT DOCUMENTS

| | | | |
|---|---|---|---|
| 6,735,633 B1 * | 5/2004 | Welch et al. .................. | 709/233 |
| 7,657,648 B2 * | 2/2010 | Xiong et al. .................. | 709/231 |
| 7,827,243 B2 * | 11/2010 | Lee et al. ...................... | 709/205 |
| 2004/0236863 A1 * | 11/2004 | Shen et al. .................... | 709/231 |
| 2006/0146875 A1 * | 7/2006 | Yang ............................. | 370/468 |
| 2007/0110063 A1 * | 5/2007 | Tang et al. .................... | 370/390 |

FOREIGN PATENT DOCUMENTS

| | | |
|---|---|---|
| JP | 8130551 | 11/1994 |
| JP | 20050047570 | 2/2005 |

\* cited by examiner

*Primary Examiner* — Brian Roberts
(74) *Attorney, Agent, or Firm* — Van Pelt, Yi & James LLP

(57) ABSTRACT

Link data transmission to a plurality of nodes includes: receiving data to be transmitted at a current node; obtaining, using one or more computer processors, first registration information by a plurality of child nodes of the current node; selecting, based on the first registration information, a first child node that is one of the plurality of child nodes to register with the current node; sending the data to be transmitted to the first child node; obtaining second registration information by a plurality of sibling nodes of the current node; selecting, based on the second registration information, a first sibling node that is one of the plurality of sibling nodes to register with the parent node; and sending the data to be transmitted to the first sibling node.

19 Claims, 6 Drawing Sheets

LINK DATA TRANSMISSION METHOD, NODE AND SYSTEM

CROSS REFERENCE TO OTHER APPLICATIONS

This application is a continuation of co-pending U.S. patent application Ser. No. 12/592,342, entitled LINK DATA TRANSMISSION METHOD, NODE AND SYSTEM filed Nov. 23, 2009 which is incorporated herein by reference for all purposes, which claims priority to the People's Republic of China Patent Application No. 200810180167.5 entitled LINK DATA TRANSMISSION METHOD, NODE AND SYSTEM filed on Nov. 28, 2008 which is incorporated herein by reference for all purposes.

FIELD OF THE INVENTION

The present invention relates to the field of data transmission technology, and in particular to a method, node and system for link data transmission.

BACKGROUND OF THE INVENTION

With the development of the Internet technologies, two devices in a network can share resources through data transmission. In certain applications, data may need to be copied from a source device to multiple destination devices. In a commonly used method, a source device where the source data is located copies the source data to a plurality of destination devices one by one. Such a method is inconvenient to implement, and may also occupy the bandwidth between a source device and a destination device during a copy operation between the two. Particularly in situations where the destination devices and the source device are located in different network sections and the destination devices are located in the same network section, such a copy method apparently wastes valuable inter-network bandwidth resources between different network sections.

Presently, the peer-to-peer (P2P) or node-to-node technology is a popular data transmission technique. In P2P, at the same time of receiving data a device may also transmit the received data to other devices. The bandwidth available between the destination devices that are otherwise idle can thus be used. When P2P is employed in the above scenario, the intra-network bandwidth available between the destination devices can be used effectively, potentially reducing the amount of data transmission on the inter-network bandwidth between different network sections and saving the inter-network bandwidth resources.

A number of issues remain in existing P2P technology. In the currently P2P applications, each device typically can only control sending from and receiving data to itself (e.g., controlling the sending rate and the receiving rate, and the number of destination devices, etc.), and a unitary control for data transmission of an entire network typically cannot be achieved at a single device using the transmission mechanism of P2P. When the amount of data transmission is too large, it may overwhelm and paralyze the network.

In the above-described application scenario where a source device needs to copy data to multiple destination devices and the data transmission is initiated by the source device, when a change occurs in the amount of the data transmission and/or the number of the destination devices, the current P2P technology typically cannot implement a unitary control on a single source device (or on a certain destination device) for the data transmission of the whole network, since the destination devices may only receive data passively.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A link copy (LCP) technique is provided herein. First, a system for link data transmission in accordance with some embodiments is provided herein. In some embodiments, the system includes a data source node and at least one data destination node. A tree connection is established between the data source node and the data destination node. The data destination node is a child node of the data source node.

Embodiment 1

Figure 1:
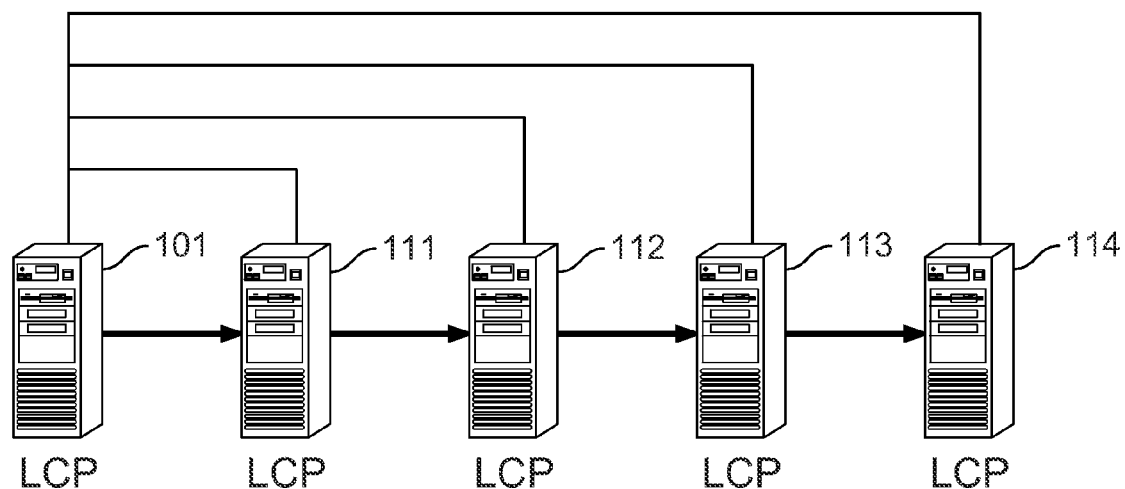
FIG. 1 is a schematic diagram of a system for link data transmission in accordance with some embodiments.

FIG. 1 is a schematic diagram of a system for link data transmission in accordance with some embodiments. In this example, 101 denotes a data source node, 111-114 denote data destination nodes, and the lines between the nodes denote connections established between the nodes. As used here, a node refers to a computing device capable of transmitting and receiving data. It can be seen that the system is of a two-level tree structure, the source node 101 is a parent node in the tree structure and each of the destination nodes 111-114 is a child node of the node 101. The nodes 111-114 have the same parent node 101 and are thus sibling nodes of one another.

In FIG. 1, the arrows between the nodes indicate the data transmission occurring in the system. It can be seen that the data source node 101 sends data to a child node (denoted by 111 in FIG. 1) of itself; upon receiving the data, one of the data destination nodes 111-114 sends the received data to a sibling node of itself To avoid repeated data transmission, the sibling node should be selected as a node that has not obtained the data to be transmitted. The data transmission path indicated in the figure is 111→112→113→114. When the node 114 receives the data, all the sibling nodes of it have already received the data to be transmitted. Therefore, the node 114 does not send data to another node and the data transmission is terminated.

Embodiment 2

Figure 2:
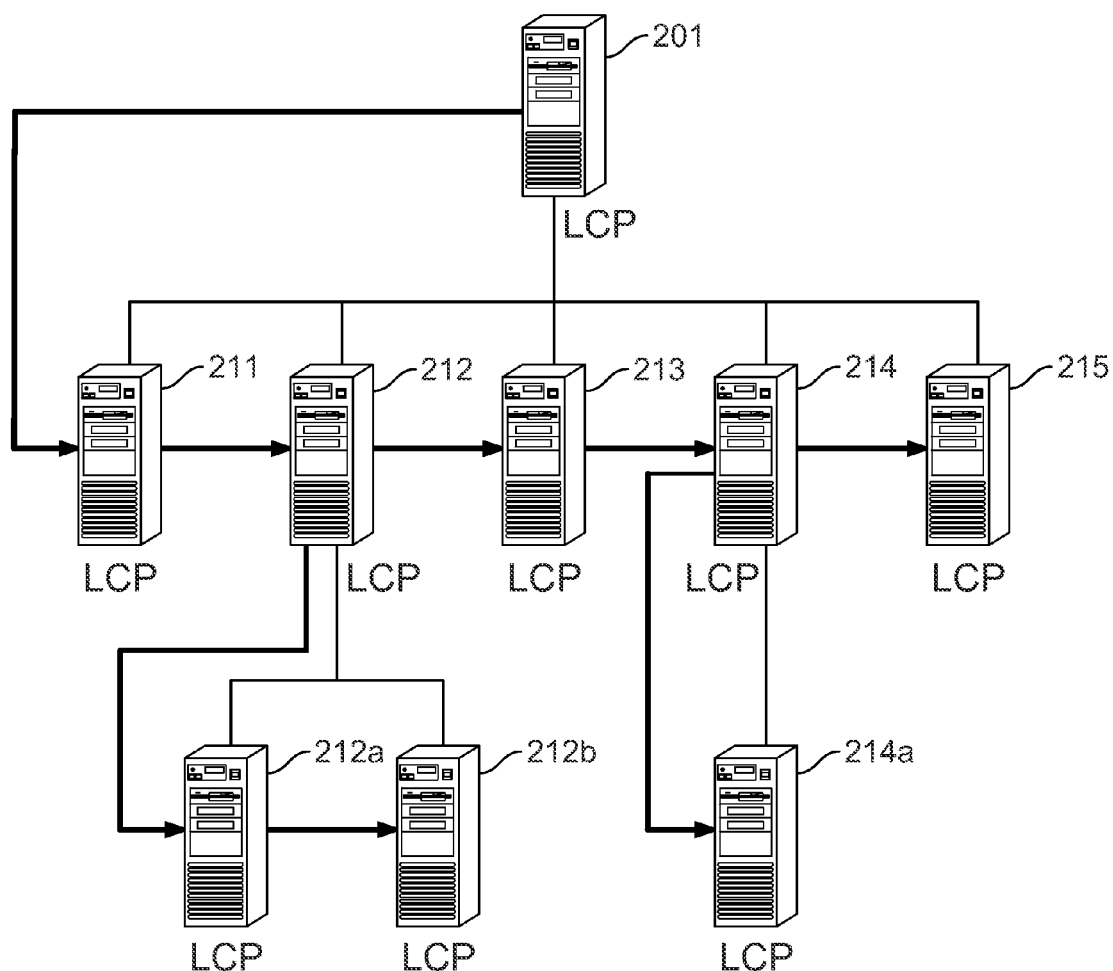
FIG. 2 is a schematic diagram of another system for link data transmission in accordance with some embodiments.

FIG. 2 is a schematic diagram of another system for link data transmission in accordance with some embodiments. The system of FIG. 2 differs from that of FIG. 1 in that the system shown in FIG. 2 includes a three-level tree structure. The source node 201 is a parent node in the tree structure and each of the destination nodes 211-215 is a child node of node 201. Nodes 211-215 are sibling nodes of one another. Each of the nodes 212a and 212b is a child node of the node 212. Nodes 212a and 212b are sibling nodes of each other. Node 214a is a child node of node 214.

From the arrows in FIG. 2, it can be seen that a destination node with a child node may send the received data to a child node in addition to a sibling node. For example, node 212 sends the data to 213 of its sibling nodes and 212a of its child nodes, and node 214 sends the data to 215 of its sibling nodes and 214a of its child nodes.

Figure 3:
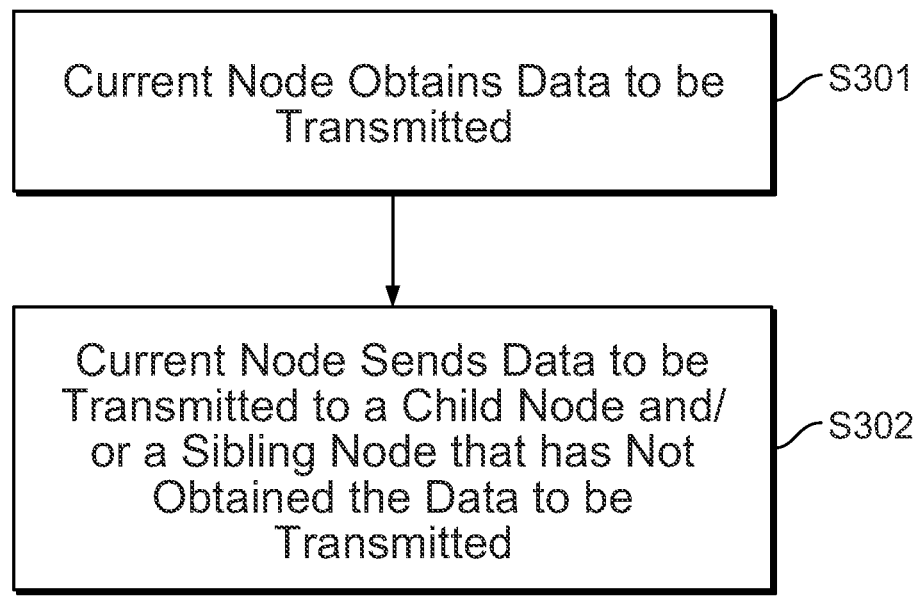
FIG. 3 is a flowchart of implementing a method in accordance with some embodiments.

A data transmission mechanism implemented by each node in a link data transmission system in accordance with some embodiments may be summarized as a flow shown in FIG. 3, which includes the following steps.

S301, a current node obtains data to be transmitted. If the current node is a data source node, the obtained data is the original data to be transmitted. If the current node is a data destination node, it receives the data to be transmitted that is sent from another node.

S302, the current node sends the data to be transmitted to one of its child nodes, and one of its sibling nodes that has not obtained the data to be transmitted.

Therefore, after receiving data, the current node continues to send the data to two nodes. If the two nodes meeting the above conditions cannot be found, no data is sent correspondingly. According to such a transmission mechanism, after being sent out from the source node, data may be sent to all the destination nodes in a traversed way, and no repeated data transmission will occur between the destination nodes.

It is to be noted that although a two-level and a three-level structure having been mentioned with respect to Embodiments 1 and 2 described above, it readily occurs to those skilled in the art that other forms of systems with a tree structure employing the data transmission mechanism provided herein fall into the scope of the present invention.

To establish a tree connection, in some embodiments the destination nodes in the same network or subnet is connected with a parent node. In FIG. 2 for example, nodes 211-215 are located in the same network A, nodes 212a and 212b are located in the same network B and node 214a is located in the network C. In this case, data may occupy only one data path when being transmitted between network sections, and most of the data is transmitted between sibling nodes in a unidirectional way, thus effectively taking use of the intra-network bandwidth for data transmission.

Because there is only one data path between the parent node and the child nodes, a unitary control for the data transmission of the whole network may be achieved simply by controlling this data path. For example, with respect to the data path between the source node 201 and the destination node 211, the data transmission rate may be controlled at node 201 or 211.

Since the parent node needs to manage the relevant information of the child nodes, it often has a relatively high workload. Therefore, in some embodiments it is selected to control the transmission rate at a child node. For example, the rate at which node 211 receives data from node 201 may be controlled at node 211. Because node 211 is the first and only destination node that obtains data from the source node, the rate of the subsequent data transmission between sibling nodes or between a parent node and a sibling node apparently cannot exceed the limited rate, thereby achieving a unitary control for the data transmission of the whole network.

It readily occurs to those skilled in the art that the rate at which node 211 sends data to node 212 may also be controlled at node 211 (if node 211 has a child node, the rate in which node 211 sends data to the child node may also be controlled at node 211). Further, the data receiving rate, the data sending rate to a succeeding sibling node and the data sending rate to a child node may be controlled at each destination node, thereby achieving a more precise management to the network.

Embodiment 3

In various embodiments, to ensure that a destination node sends data to one sibling node of it which has not obtained any data, the above data transmission mechanism may be modified as follows.

The source node sends the data to be transmitted to the first child node that is connected with it. In some embodiments the first child node that is connected with the source node is the first child node that establishes a connection with the source node.

A destination node receives the data to be transmitted and sends the received data to be transmitted to the first child node that is connected with it and to the first succeeding node that is connected with the parent node of it. In some embodiments, the first succeeding node that is connected with the parent node of the source node is the sibling node that establishes a connection with the parent node of the source node. Such a node succeeding is hereinafter referred to as a succeeding sibling node.

In some embodiments, during the process of establishing a tree connection, a node x may establish a connection with a node y and thus become a child node of node y by registering with node y. Then, node x may send registration information to node y at a certain time interval (e.g., 1 second time interval) so as to keep the connection with node y. A parent node may obtain the connection status of a child node in a timely way by detecting the registration information of the child node periodically. Therefore, when the parent node needs to send or forward data, the parent node may know about which child node will receive the data. On the other hand, when detecting that a child node fails to register successively for a certain number of times, the parent node may remove the child node from its child node list and adjust the transmission strategy.

Taking the system shown in FIG. 2 as an example, and assuming that nodes 211-215 register with node 201 in a numerical order and nodes 212a and 212b register with node 212 in an alphabetical order, the following can be derived according to the above modified transmission mechanism. The source node 201 sends data to be transmitted to the first child node 211 that registers with it. The destination node 211 receives the data to be transmitted that is sent from node 201, and sends the received data to be transmitted to the succeeding sibling node 212 of it (because node 211 has no child node, no sending to a child node takes place). In some embodiments, the succeeding sibling node 212 is a first sibling node that establishes a connection with the parent node of the source node, for example by registering with the parent node. The destination node 212 receives the data to be transmitted that is sent from node 211, and sends the received data to be transmitted to the succeeding sibling node 213 of it, and to the first child node 212a that registers with it. The sending rules for other destination nodes can be derived similarly and are not described here.

If a node fails, the parent node of it may be aware of this status by detecting registration information of the child node periodically and make a corresponding adjustment. If node 211 fails, node 201 may delete the information of node 211 from its child node list. Here, node 212 becomes the first child node that registers with node 201. If node 212 fails, node 201 may delete the information of node 212 from its child node list and inform such status to node 211 that registers prior to node 212. Here, node 213 becomes the succeeding sibling node of node 211.

The failures of other nodes can be treated similarly. In some embodiments, from the point of view of the whole network, a failure of a node is substantially equivalent to establishment of a new tree connection (this is also the case if a new node is added into the network). Each node remains to receive and send data according to the original transmission mechanism. The only change lies in the objects referred to by "the first child node that is connected with it" and "the succeeding sibling node".

In the modified transmission mechanism, data is transferred to a second node from a first node, where the first node is at the same tree level as the second node and the first node registers with a common parent prior to the second node. This reflects the rule that a destination node sends data to a sibling node of it which has not obtained any data. Also, to determine the direction of data transmission according to the order in which the nodes register facilitate the management to the data transmission.

Embodiment 4

In a process of data transmission between two nodes, to avoid a failure of the data transmission due to a network fault, data to be transmitted may be divided into a number of data blocks for transmission at the sender node. When receiving the data, the receiver node (e.g., the destination node) checks whether all the data blocks have been received and if not, only needs to request the sender node to resend the lost data blocks.

In some embodiments, data is transmitted between computers in the form of files. Transmission of each file is handled by a separate thread, which is termed as FileTask. A FileTask is divided into four phases: OpenFile (starting transmission of file), Blocks (transmitting contents of file), EndFile (ending transmission of file) and RecovFile (recovering lost blocks). A file is transmitted in the form of file blocks. The receiver node performs a check when receiving a file block. If a data error occurs, recovery of the erroneous data blocks may be requested separately during the RecovFile phase, and there is no need to retransmit the whole file.

In some embodiments, a FileTask is established first at the sender node, including a task child node list (FileClients) and a task succeeding sibling node list (FileNexts) of the sender node. Once established, the FileClients and FileNexts do not change within the duration of the task. This is to ensure that the sending of the current file is not affected when the structure of the network is updated.

After receiving the OpenFile message, the receiver node may also establish a new FileTask, also including a FileClients and a FileNexts of the receiver node. In the FileTask, all the control messages, including OpenFile and EndFile messages, may be sent to all the nodes that are recorded in the FileClients, and the data message Block may be sent to the first node that is recorded in the FileClients and FileNexts. In some embodiments, the control messages and data message arrive in an order of OpenFile→Block→EndFile. However, each node can also handle such status as wrong order, or error in or lose of some data blocks.

If a file data block (Block) is received before the OpenFile, a FileTask is still established, but a temporary file is opened for writing file data. If the OpenFile is lost, necessary file information may also be obtained from the EndFile. The name of the temporary file may be changed after the file information (for example path of file) is obtained from the OpenFile or EndFile.

The path of file is updated after the EndFile is received (the receipt will check the path of file if the OpenFile has already been received), the number of Blocks in the FileTask is updated, the reception of the Blocks is checked, and the message RecovBlock is issued to recover blocks. Afterwards, the FileTask still can receive a data block: for the OpenFile, the path of file is checked; for the Block, there is no difference between a normally sent Block and RecovBlock, and the Block is disregarded directly if having been received successfully and is otherwise written into the file. The EndFile message contains the number of Blocks. If all the Blocks are received successfully, the FileTask exits the cycle of processing the data blocks.

Before the FileTask ends, if the check fails or the file information is not complete (both OpenFile and EndFile are lost, or some Blocks are lost), the file is deleted directly. After the FileTask starts, if no data block is received after a certain period of time, it may be determined that the FileTask can be finished. Such a mechanism can ensure release of file information resources.

In the present embodiment, an error processing mechanism of a data transmission solution according to some embodiments is further introduced. In some embodiments, data is transmitted between nodes in the form of data blocks, and only erroneous data blocks need to be retransmitted when an error in transmission occurs, thereby effectively saving the transmission time and network bandwidth.

It is to be understood by those skilled in the art that all or part of the steps for implementing the above method embodiments may be performed through hardware related to program instructions, which may be stored on a computer-accessible storage medium and which, when being executed, perform the steps for the above method embodiments. The storage medium includes an ROM, an RAM, a magnetic disk, an optical disk and other mediums that can store program codes thereon.

Embodiment 5

Figure 4:
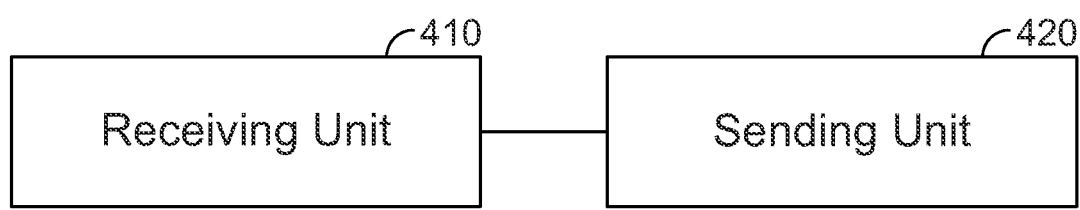
FIG. 4 is a schematic diagram of a node for link data transmission in accordance with some embodiments.

A node for link data transmission in accordance with some embodiments is provided herein. The node is configured to perform the processes described above. As shown in FIG. 4, an example node includes a receiving unit 410 configured to obtain data to be transmitted. For a data source node, the receiving unit 410 is configured to obtain original data to be transmitted, and for a destination node, the receiving unit 410 is configured to receive the data to be transmitted that is sent from another node. The node additionally includes a sending unit 420 configured to send, when the node for link data transmission has at least one child node, the data to be transmitted that is received by the receiving unit 410 to one of the at least one child node, and send when the node for link data transmission has at least one sibling node that has not obtained the data to be transmitted the data to be transmitted that is received by the receiving unit 410, to one of the at least one sibling node.

Figure 5:
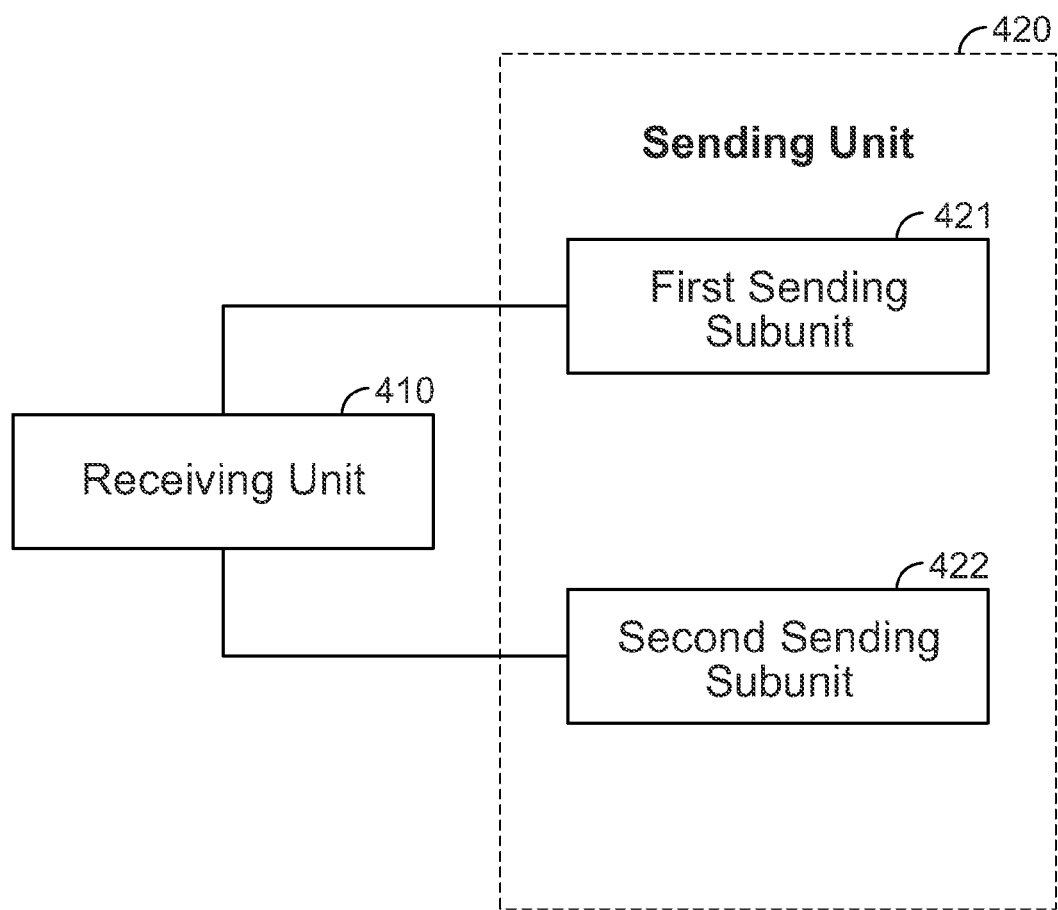
FIG. 5 is a schematic diagram of another node for link data transmission in accordance with some embodiments.

Referring to FIG. 5, the sending unit 420 may include a first sending subunit 421 configured to send the data to be transmitted that is received by the receiving unit to the first child node that is connected with the node for link data transmission; and a second sending subunit 422 configured to send the data to be transmitted that is received by the receiving unit to a node that succeeds the node for link data transmission and is the first node connected with the parent node of the node for link data transmission.

The above two sending subunits substantially represent a further optimization of the sending unit 420. In the optimized mechanism, data is transferred to a node from the node at the same level that registers previously to it. This reflects the rule that a destination node sends data to a sibling node of it which has not obtained any data. Also, to determine the direction of data transmission according to the order in which the nodes register facilitates the management to the data transmission.

Figure 6:
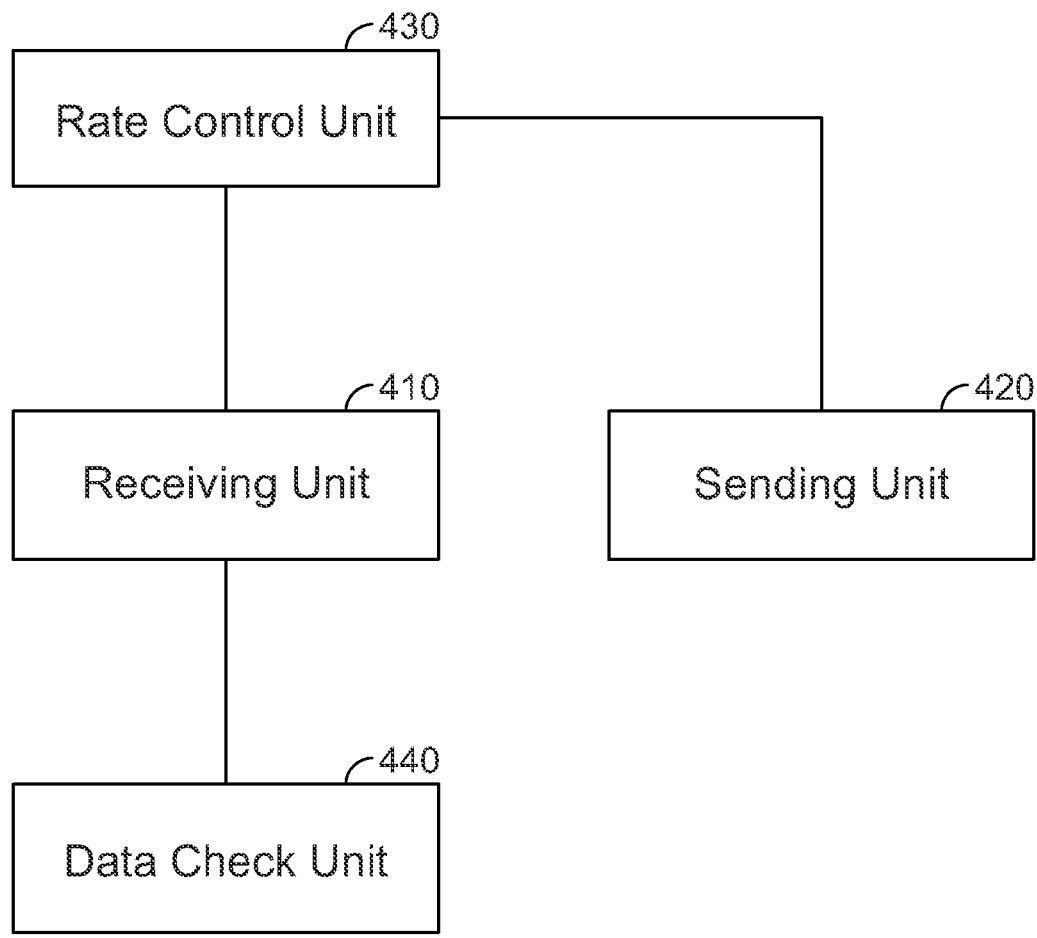
FIG. 6 is a schematic diagram of still another node for link data transmission in accordance with some embodiments.

Referring to FIG. 6, the node for link data transmission may further include: a rate control unit 430 configured to control the data receiving rate of the receiving unit 410 and/or the data sending rate of the sending unit 420. If the receiving unit receives the data to be transmitted that is sent from another node, the node for link data transmission may further include a data check unit 440 configured to check whether the data to be transmitted that is received by the receiving unit 410 is complete and if not, request the data sending node to resend the lost parts of the data.

The units described above can be implemented as software components executing on one or more general purpose processors, as hardware such as programmable logic devices and/or Application Specific Integrated Circuits designed to perform certain functions or a combination thereof. For example, in some embodiments, the sending unit and the receiving unit are implemented as communication interface hardware that executes supporting software and firmware. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

The description of the device embodiments that substantially correspond to the method embodiments is relatively brief and reference may be made to the passages for the method embodiments for the details. The device embodiments described above are merely illustrative, where the units that are described as separate components may be or may not be physically separate from each other, and the components indicated as units may be or may not be physical units, and may be disposed at the same site, or distributed over multiple network elements. Parts or all of the modules may be selected as required to achieve the objects of the embodiments according to the present invention, which can be understood and implemented by those skilled in the art without inventive effort. In some embodiments, the device includes one or more processors and one or more memory for providing the processor(s) with instructions. The processor(s) are configured to perform the functions of the one or more units described above.

The above are merely some specific embodiments of the present invention. Those skilled in the art can make various alterations and modifications without departing from the spirit and scope of the invention. Such alterations and modifications are intended to fall into the scope of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for link data transmission to a plurality of nodes, comprising:
   receiving data to be transmitted at a current node;
   obtaining, using one or more computer processors, first registration information by a plurality of child nodes of the current node;
   selecting, based on the first registration information, a first child node that is one of the plurality of child nodes to register with the current node;
   sending the data to be transmitted to the first child node;
   obtaining second registration information by a plurality of sibling nodes of the current node;
   selecting, based on the second registration information, a first sibling node that is one of the plurality of sibling nodes to register with a parent node; and
   sending the data to be transmitted to the first sibling node,
   wherein the first registration information including an order in which the child nodes are registered with the current node, and the first child node is the first one among the plurality of child nodes to register with the current node.

2. A method for link data transmission to a plurality of nodes, comprising:
   receiving data to be transmitted at a current node;
   obtaining, using one or more computer processors, first registration information by a plurality of child nodes of the current node;
   selecting, based on the first registration information, a first child node that is one of the plurality of child nodes to register with the current node;
   sending the data to be transmitted to the first child node;
   obtaining second registration information by a plurality of sibling nodes of the current node;

selecting, based on the second registration information, a first sibling node that is one of the plurality of sibling nodes to register with a parent node; and sending the data to be transmitted to the first sibling node, wherein the second registration information including an order in which the sibling nodes are registered with a parent node of the current node, and the first sibling node is the first one among the plurality of sibling nodes to register with the parent node.

3. The method of claim 1, wherein the plurality of nodes form a tree connection.

4. The method of claim 1, further comprising controlling a data receiving rate.

5. The method of claim 1, further comprising controlling a data sending rate to the at least one child node.

6. The method of claim 1, further comprising controlling a data sending rate to the at least one sibling node.

7. The method of claim 1, further comprising setting a destination node to which the data to be transmitted is sent as a new current node, and receiving new data to be transmitted at the new current node.

8. The method of claim 1, further comprising establishing a tree connection among the plurality of nodes, including connecting the nodes located in a single network with a single parent node.

9. The method of claim 1, wherein a child node maintains a connection with a parent node by sending registration information to the parent node periodically.

10. The method of claim 1, further comprising:
determining whether the received data is complete; and
in the event that the received data is incomplete, requesting a data sending node to resend lost parts of the data.

11. A link data transmission node comprising:
an interface configured to:
receive data transmitted from a source node;
a processor coupled to the interface, configured to:
obtain first registration information by a plurality of child nodes;
select, based on the first registration information, a first child node that is one of the plurality of child nodes to register with the link data transmission node;
obtain second registration information by a plurality of sibling nodes of the link data transmission node; and
select, based on the second registration information, a first sibling node that is one of the plurality of sibling nodes to register with a parent node;
and wherein the interface is further configured to:
send the data to be transmitted to the first child node; and
send the data to be transmitted to the first sibling node; and
wherein the first registration information including an order in which the child nodes are registered with the link data transmission node, and the first child node is the first one among the plurality of child nodes to register with the link data transmission node.

12. A link data transmission node comprising:
an interface configured to:
receive data transmitted from a source node;
a processor coupled to the interface, configured to:
obtain first registration information by a plurality of child nodes;
select, based on the first registration information, a first child node that is one of the plurality of child nodes to register with the link data transmission node;
obtain second registration information by a plurality of sibling nodes of the link data transmission node; and select, based on the second registration information, a first sibling node that is one of the plurality of sibling nodes to register with a parent node;
and wherein the interface is further configured to:
send the data to be transmitted to the first child node; and
send the data to be transmitted to the first sibling node; and
wherein the second registration information including an order in which the sibling nodes are registered with a parent node of the link data transmission node, and the first sibling node is the first one among the plurality of sibling nodes to register with the parent node.

13. The system of claim 11, wherein the processor is further configured to control a data receiving rate.

14. The system of claim 11, wherein the processor is further configured to control a data sending rate to the at least one child node.

15. The system of claim 11, wherein the processor is further configured to control a data sending rate to the at least one sibling node.

16. The system of claim 11, wherein the processor is further configured to set a destination node to which the data to be transmitted is sent as a current node to receive new data.

17. The system of claim 11, wherein the processor is further configured to:
determine whether the received data is complete; and
in the event that the received data is incomplete, request a data sending node to resend lost parts of the data.

18. A system for link data transmission, comprising:
a plurality of nodes that form a tree connection; wherein
a current node among the plurality of nodes is configured to:
receive data to be transmitted;
obtain first registration information by a plurality of child nodes of the current node;
select, based on the first registration information, a first child node that is one of the plurality of child nodes to register with the current node;
send the data to be transmitted to the first child node;
obtain second registration information by a plurality of sibling nodes of the current node;
select, based on the second registration information, a first sibling node that is one of the plurality of sibling nodes to register with a parent node; and
send the data to be transmitted to the first sibling node; and
wherein the first registration information including an order in which the child nodes are registered with the link data transmission node, and the first child node is the first one among the plurality of child nodes to register with the link data transmission node.

19. A system for link data transmission, comprising:
a plurality of nodes that form a tree connection; wherein
a current node among the plurality of nodes is configured to:
receive data to be transmitted;
obtain first registration information by a plurality of child nodes of the current node;
select, based on the first registration information, a first child node that is one of the plurality of child nodes to register with the current node;
send the data to be transmitted to the first child node;
obtain second registration information by a plurality of sibling nodes of the current node;
select, based on the second registration information, a first sibling node that is one of the plurality of sibling nodes to register with a parent node; and send the data to be transmitted to the first sibling node; and wherein the second registration information including an order in which the sibling nodes are registered with a parent node of the link data transmission node, and the first sibling node is the first one among the plurality of sibling nodes to register with the parent node.

* * * * *